United States Patent [19]

Chen

[11] Patent Number: 5,785,045
[45] Date of Patent: Jul. 28, 1998

[54] DISPOSABLE BARBECUE SET

[76] Inventor: Jan-Mao Chen, RM. 5C01, No. 5, Hsin-Yi Rd. Sec.5, Taipei, Taiwan

[21] Appl. No.: 783,450

[22] Filed: Jan. 16, 1997

[51] Int. Cl.$^6$ .................................................. F24C 1/16
[52] U.S. Cl. ............................... 126/9 A; 126/25 R
[58] Field of Search ....................... 126/25 R, 9 R, 126/9 A

[56] References Cited

U.S. PATENT DOCUMENTS

| 3,682,154 | 8/1972 | Mollere | 126/9 A |
| 5,638,743 | 6/1997 | Lo | 126/25 R |

*Primary Examiner*—Carroll B. Dority
*Attorney, Agent, or Firm*—Erik M. Arnhem

[57] ABSTRACT

Disclosed is a disposable Barbecue Set which mainly includes an outer case, a heat-insulation inner paper wall provided inside the outer case, a supporting stand positioned inside the inner paper wall, multiple synthetic charcoal blocks positioned in the supporting stand, and a gridiron covering a top of the outer case. All parts of the hibachi are made of light weight and reusable material for recycling purpose. The synthetic charcoal blocks supplied along with the Barbecue Set are provided with ignition fuses. The Barbecue Set has simple structure and a user needs only to remove a shrinked plastic film from the outer case without the need to separately prepare charcoal or to assemble the gridiron before grilling.

1 Claim, 4 Drawing Sheets

DISPOSABLE BARBECUE SET

BACKGROUND OF THE INVENTION

Most conventional means for grilling have the following disadvantages:

1. The used grilling means usually forms difficulties of causes troubles in environmental cleaning.
2. The grilling means usually consists of many different parts and therefore require a lot of time to assemble the parts to form a complete grill means.
3. The conventional grill means tends to injure a used due to an improper use of the conventional grill means.

It is therefore desirable to develop a grilling means to eliminate the disadvantages existed in the conventional means for grilling.

SUMMARY OF THE INVENTION

A primary object of the present invention is to provide a disposable Barbecue Set which is completed with all necessary parts in an assembled condition and therefore can be unpacked for direct use without any further assembling.

Another object of the present invention is to provide a disposable Barbecue Set which is provided with synthetic charcoal blocks having ignition fuses, allowing the grilling to be safely and conveniently proceeded.

A further object of the present invention is to provide a disposable Barbecue Set of which all parts are made of material that can be recycled to reduce environmental pollution.

To achieve the above and other objects, the disposable Barbecue Set according to the present invention mainly includes an outer case, a heat-insulation inner paper wall provided inside the outer case, a supporting stand positioned inside the inner paper wall, multiple pieces of synthetic charcoal positioned in the supporting stand, and a gridiron covering a top of the outer case. The Barbecue Set of the present invention is characterized in that all parts thereof are made of light weight and reusable material for recycling purpose (for example, the outer case can be made of disposable corrugated paper), that the Barbecue Set is completed with synthetic charcoal which provides high temperature and is durable for burning, and that the Barbecue Set has simple structure and a user needs only to remove an outer plastic film (shrink wrap) from the outer case without the need to separately prepare charcoal or to assemble the gridiron before grilling. Therefore, the present invention meets the requirement of recycling to protect our environment.

DETAILED DESCRIPTION OF THE PREFERRED EMBODIMENT

Figure 1:
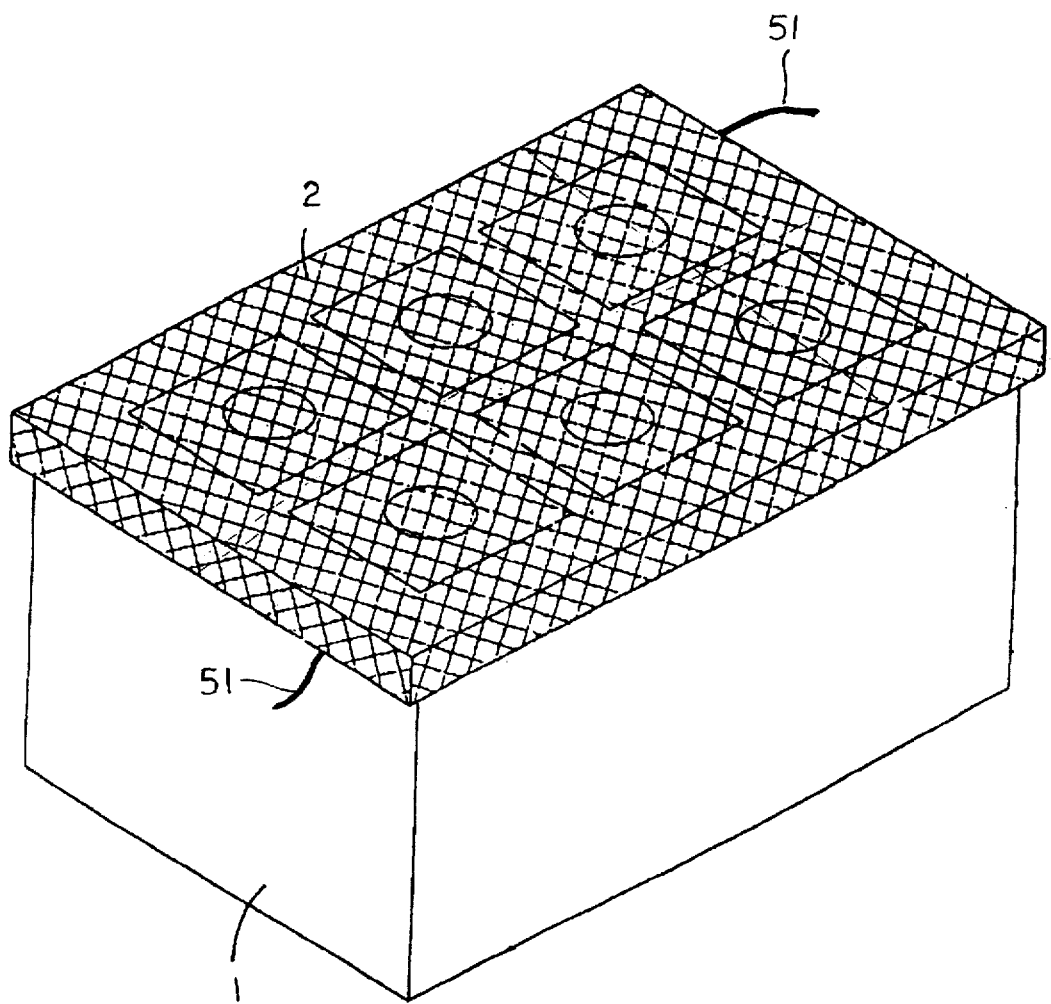
FIG. 1 is a perspective showing an appearance of the disposable Barbecue Set according to the present invention.
Figure 2:
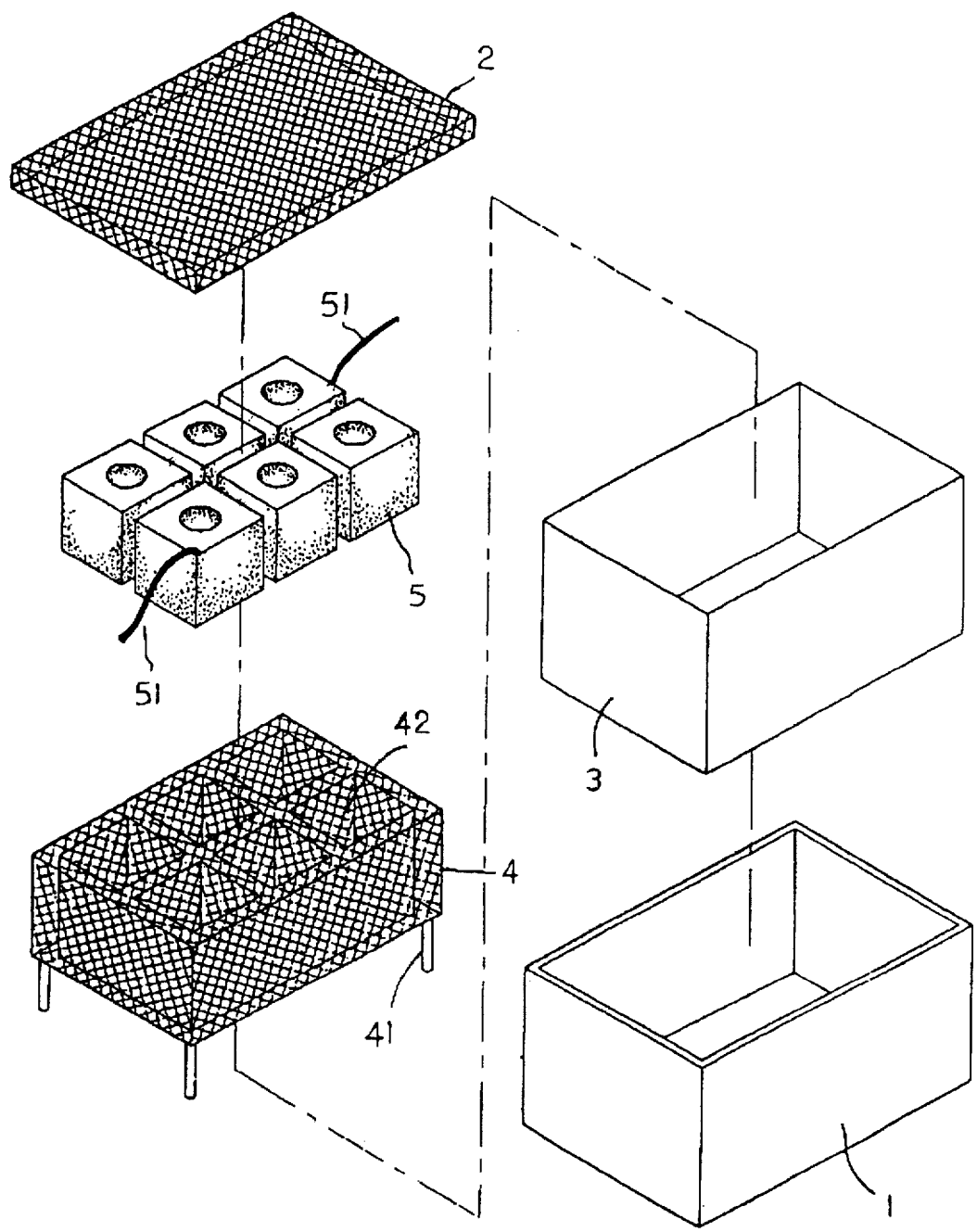
FIG. 2 is an exploded perspective of the disposable Barbecue Set of the present invention.
Figure 3:
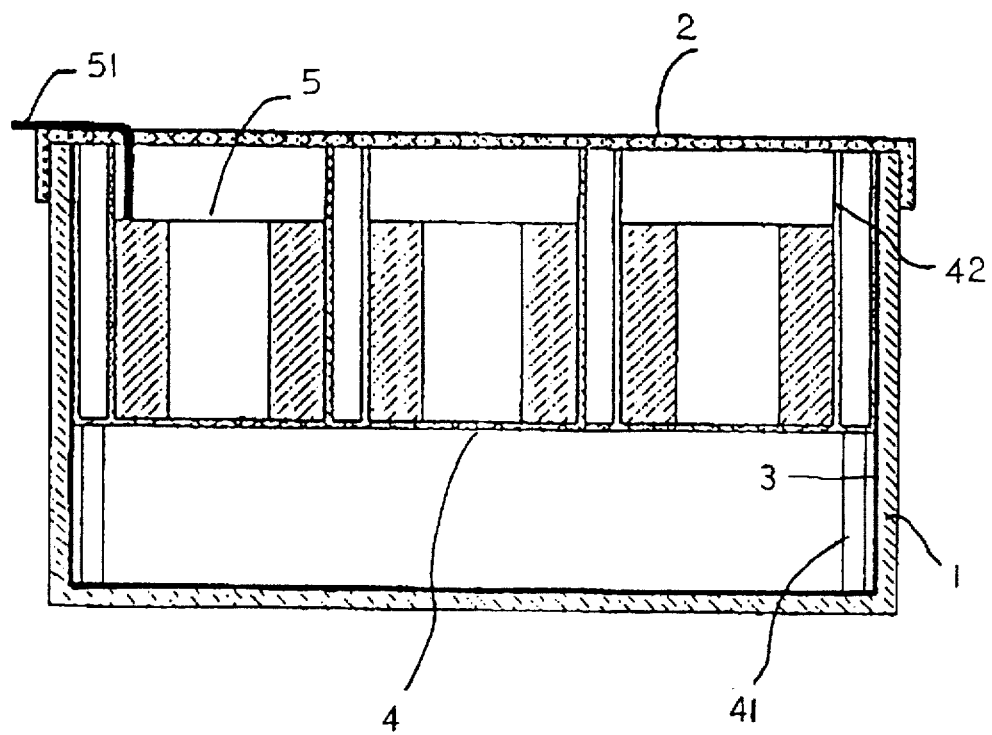
FIG. 3 is a side sectional view of the disposable Barbecue Set of the present invention.
Figure 4:
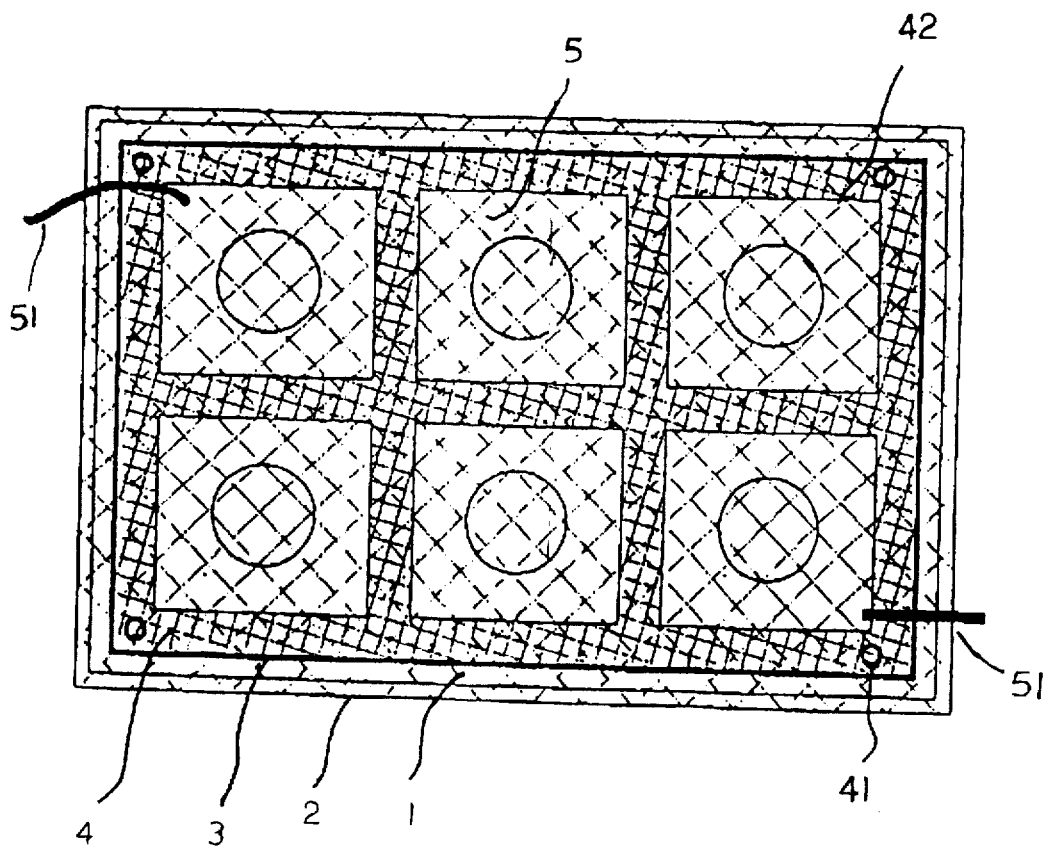
FIG. 4 is a top plan view of the disposable Barbecue Set of the present invention.

Please refer to the drawings, the present invention relates to a disposable Barbecue Set which mainly includes an outer case (1), a gridiron (2), a heat-insulation inner paper wall (3), a supporting stand (4), and a plurality of synthetic charcoal blocks (5). The outer case (1) is a hollow cuboid made of corrugated paper material. The gridiron (2) covers a top of the outer case (1) and serves as a top cover to close the other parts of the Barbecue Set inside the outer case (1) and as a means for grilling food.

The supporting stand (4) has a cuboid body formed from woven steel wires and being partitioned into several square compartments (42). The supporting stand (4) is provided with four legs (41) for stably supporting the stand (4) inside the heat-insulation paper wall (3) which is fittly positioned inside the outer case (1).

The synthetic charcoal block(5) is combustible charcoal which can be easily burned by igniting an ignition fuse (51) provided with the charcoal block (5). The synthetic charcoal blocks (5) are positioned in the square compartments (41) of the supporting stand (4) and the ignition fuses (51) in the synthetic charcoal blocks (5) connect the latter together.

The gridiron (2) is positioned on the top of the outer case (1) and the supporting stand (4). The gridiron (2) is a flat cuboid woven from steel wires.

To use the Barbecue Set of the present invention, simply tear off an outer package which can be, for example, a shrinked plastic film. Then, ignite the ignition fuses (51) on the synthetic charcoal blocks (5). And, dishes such as meat, can be put on the gridiron (2) to grill.

With the above arrangements, the present invention provides a convenient, safe and environmental protective grilling means. Users need not to assemble the Barbecue Set of the present invention before using it and the used Barbecue Set can be easily and immediately cleared away. In brief, the disposable Barbecue Set of the present invention has unique design and is economical and practical in use.

What is claimed is:

1. A disposable Barbecue Set comprising an outer case, a heat-insulation inner paper wall, a supporting stand, a plurality of synthetic charcoal blocks, and a gridiron;

said outer case being a hollow cuboid made of corrugated paper and being wrapped by a shrinked plastic film before being unpacked for use;

said heat-insulation inner paper wall being fittly disposed inside said outer case;

said supporting stand being positioned inside said inner heat-insulation paper wall and having a cuboid body made of woven steel wires and four legs, said cuboid body being partitioned into several compartments;

said synthetic charcoal blocks being combustible and being provided with ignition fuses connecting said synthetic charcoal blocks together, said synthetic charcoal blocks being separately positioned in said compartments of said supporting stand; and said gridiron being covered on a top of said outer case to serve as a top cover to close the other parts of said Barbecue Set inside said outer case before said Barbecue Set is unpacked for use and as a means for receiving food to be grilled when said shrinked plastic film of said Barbecue Set is removed;

Whereby said disposable Barbecue Set can be conveniently, safely, and sanitarily used to grill food.

* * * * *